US009656314B2

(12) United States Patent
Hirata (10) Patent No.: US 9,656,314 B2
(45) Date of Patent: May 23, 2017

(54) PRESS DIE (71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 1 day.

(21) Appl. No.: 14/284,462

(22) Filed: May 22, 2014

(65) Prior Publication Data

US 2014/0352395 A1    Dec. 4, 2014

(30) Foreign Application Priority Data

May 29, 2013 (JP) ................................ 2013-112831

(51) Int. Cl.
| B21D 37/02 | (2006.01) |
| B21D 13/02 | (2006.01) |
| H01M 8/0202 | (2016.01) |
| H01M 8/0258 | (2016.01) |

(52) U.S. Cl.
CPC ............ B21D 37/02 (2013.01); B21D 13/02 (2013.01); *H01M 8/0202* (2013.01); *H01M 8/0258* (2013.01); *Y02E 60/50* (2013.01)

(58) Field of Classification Search
CPC .... B21D 13/02; B21D 37/02; B21D 13/0202; H01M 8/02; H01M 8/0258; Y02E 60/50
USPC ........................................................ 72/478
See application file for complete search history.

(56) References Cited

U.S. PATENT DOCUMENTS

| 2,472,515 A | * | 6/1949 | Brinkoeter | ...................... 72/475 |
| 5,546,784 A | * | 8/1996 | Haas et al. | ..................... 72/413 |
| 6,578,399 B1 | * | 6/2003 | Haas et al. | ......................... 72/57 |
| 2014/0352395 A1 | * | 12/2014 | Hirata | ............................ 72/478 |

FOREIGN PATENT DOCUMENTS

| DE | 4213490 | 9/1993 |
| JP | 53-70971 | 6/1978 |
| JP | 10-94839 | 4/1998 |
| JP | 11-226674 | 8/1999 |
| JP | 2008-296262 | 12/2008 |

OTHER PUBLICATIONS

U.S. Appl. No. 14/284,450 to Kazuyuki Hirata et al., filed May 22, 2014.
U.S. Appl. No. 14/284,482 to Kazuyuki Hirata et al., filed May 22, 2014.
Official Action for DE Pat. Appl. No. 102014210063.1 having a mailing date of Nov. 2, 2015.
Official Action for JP Appl. No. 2013-112831 dated Jul. 12, 2016.

* cited by examiner

*Primary Examiner* — David B Jones
(74) *Attorney, Agent, or Firm* — Greenblum & Bernstein, P.L.C.

(57) ABSTRACT

A press die includes block rows arranged in parallel in a frame. Each block row is formed by die blocks. The block rows include a first block row and a second block row that are adjacent to each other. A joint portion between adjacent two blocks belonging to the first block row faces a side surface of a die block belonging to the second block row.

8 Claims, 8 Drawing Sheets

PRESS DIE

BACKGROUND OF THE INVENTION

The present invention relates to a press die that is used for forming, for example, a separator for a fuel cell.

Figure 7:
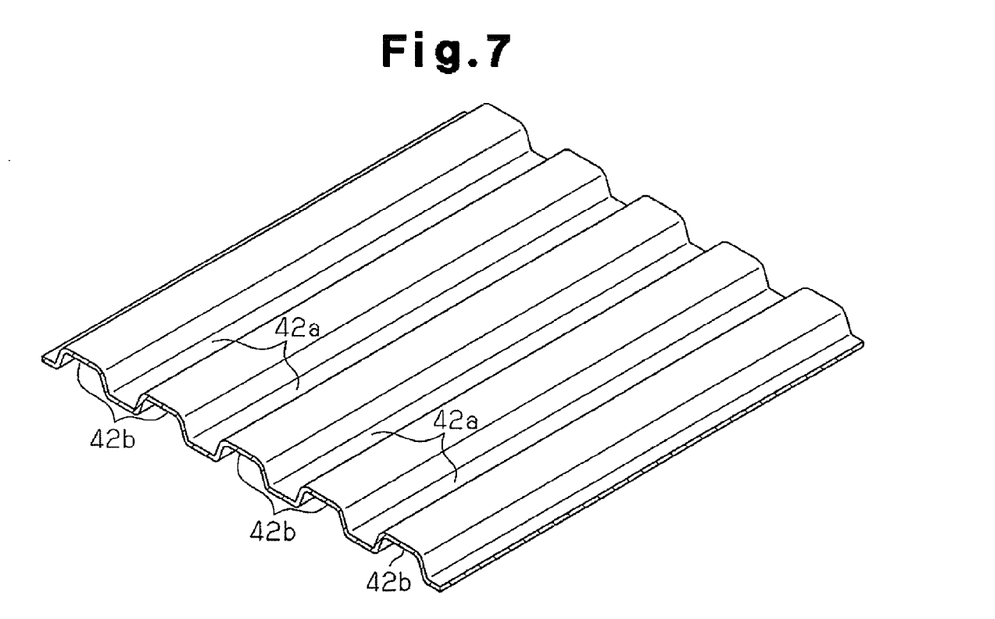
FIG. 7 is a perspective view illustrating a part of a typical separator for a fuel cell.

A typical separator for a fuel cell has a structure, for example, as shown in FIG. 7. The separator is formed of a plate 41 made of a hard material, such as titanium. The plate 41 has on its surface multiple grooves 42a at predetermined intervals. The plate 41 also has on its back grooves 42b, each of which is located between adjacent two of the above grooves 42a. The grooves 42a, 42b function as gas passages through which hydrogen gas and oxygen gas flow, respectively.

Figure 8:
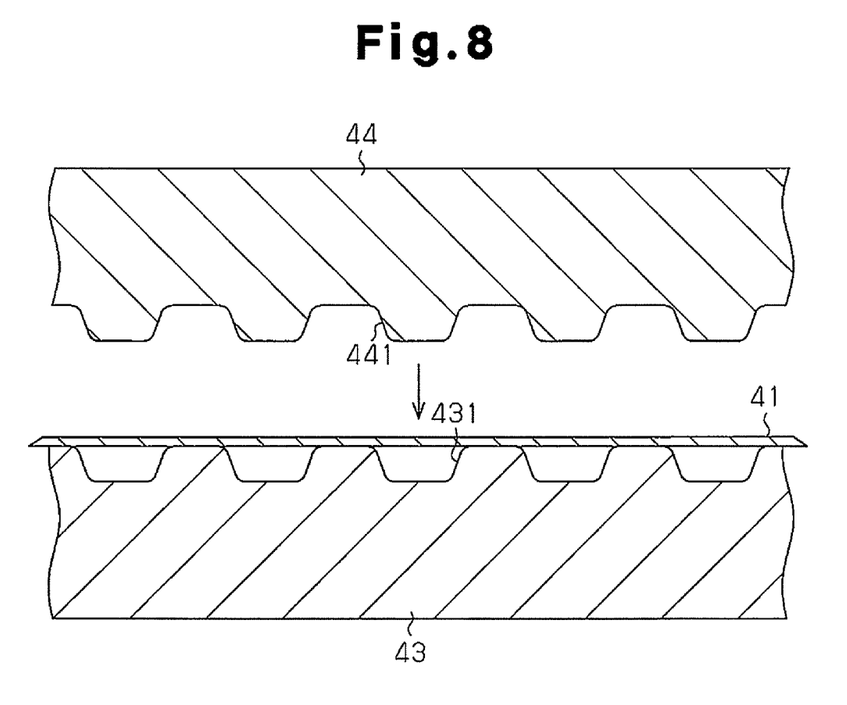
FIG. 8 is a cross-sectional view illustrating a conventional press die apparatus for forming the fuel cell separator of FIG. 7.

When forming such a separator for a fuel cell, a press die apparatus as shown in FIG. 8 is conventionally used, for example. The press die apparatus includes a lower die 43 and an upper die 44. The lower die 43 has on the upper surface a die surface 431 with grooves and protrusions, and the upper die 44 has on the lower surface a die surface 441 on which grooves and protrusions are formed to correspond to the die surface 431 of the lower die 43. The upper die 44 is arranged above the lower die 43 to be brought toward and away from the lower die 43. With a plate 41, which is a workpiece, placed on the die surface 431 of the lower die 43, the upper die 44 is brought toward the lower die 43 to press the plate 41 between the die surfaces 431, 441 of the dies 43, 44, so that the grooves 42a, 42b are formed on the plate 41.

When producing the lower die 43 and the upper die 44 of the press die apparatus, the surface of a die material is cut with a cutting tool to form the die surfaces 431, 441 having grooves and protrusions. In a case in which the die material is made of super hard metal, such as high-speed steel, the cutting tool easily becomes dull. Thus, it is difficult to form the die surfaces 431, 441 by cutting the die material at one stroke in a direction in which the grooves and protrusions extend on the die surfaces 431, 441 without replacing the cutting tool.

Figure 9:
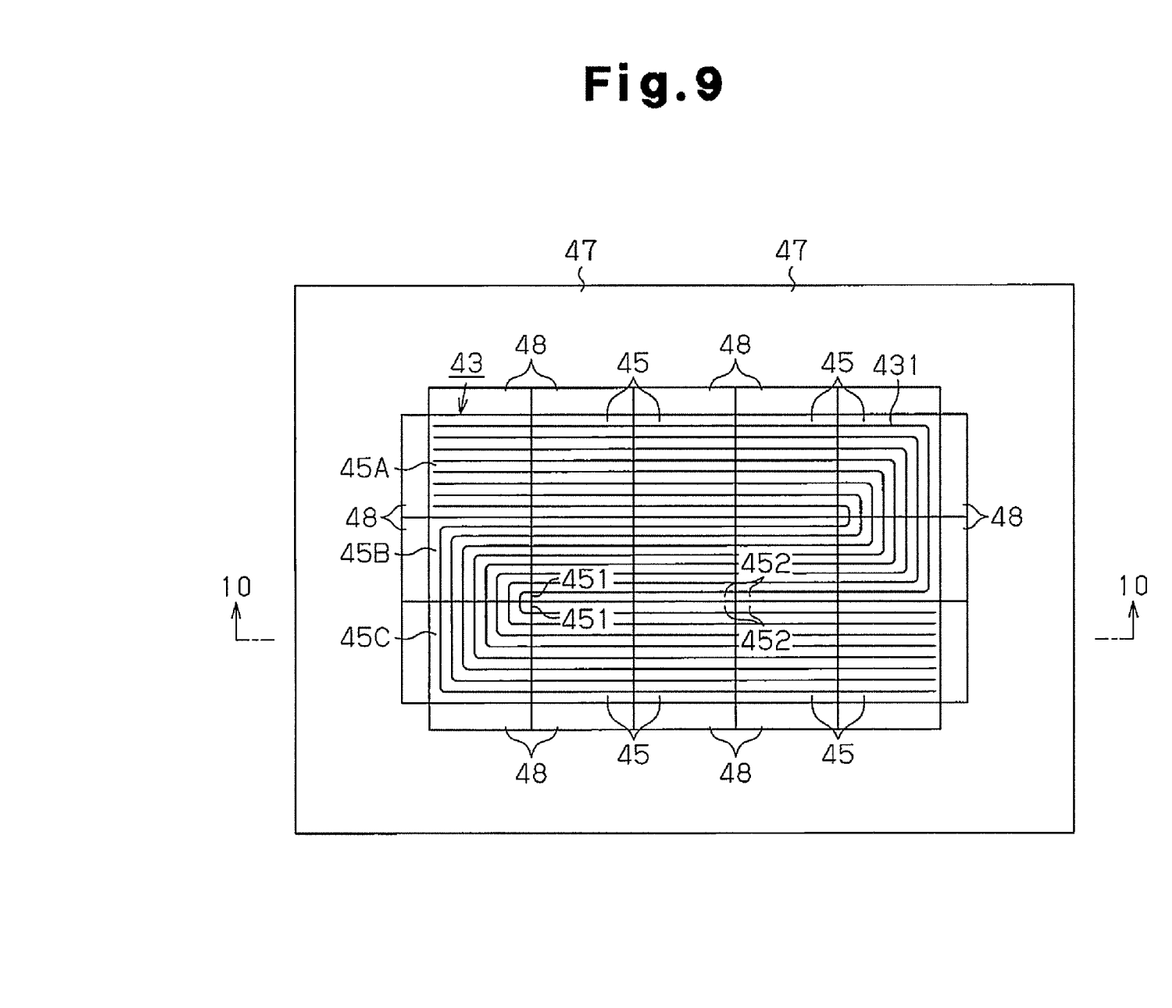
FIG. 9 is a plan view illustrating a lower die of another conventional press die apparatus.
Figure 10:
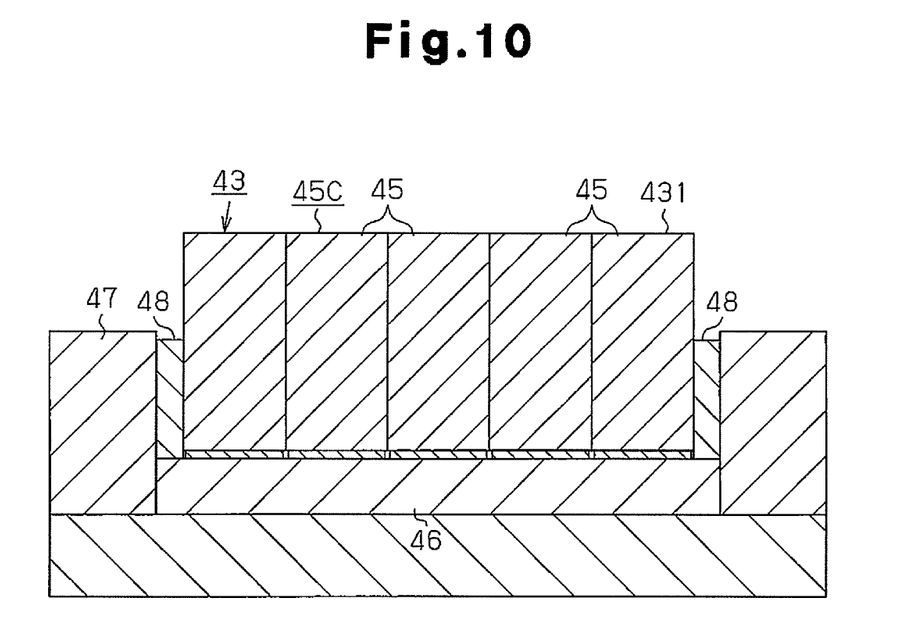
FIG. 10 is a cross-sectional view taken along line 10-10 of FIG. 9.

To deal with such a problem, a press die apparatus as illustrated in FIGS. 9 and 10 has conventionally been proposed. The press die apparatus has a lower die 43 formed by die blocks 45, which are separate rectangular columns. The die blocks 45 are placed on a base 46 and fitted in a frame 47 such that the die blocks 45 are aligned in the longitudinal direction and the transverse direction of the frame 47. A space member 48 is located between the inner surface of the frame 47 and each die block 45 adjacent thereto. According to this configuration, the die surface 431 with grooves and protrusions can be easily formed by cutting limited parts of the end faces of the die blocks 45 individually and then joining the cut surfaces of the die blocks 45. Although not illustrated, the upper die of the press die apparatus is configured by die blocks that are aligned as in the same manner as in the lower die 43.

On the other hand, Japanese Laid-Open Patent Publication No. 2008-296262 discloses a press machine of die-quench method, in which heated steel material is pressed by upper and lower dies. The lower die of the press machine is formed by separate die blocks, so that thermal expansion and contraction of the lower die as a whole are suppressed. The die blocks are arranged side by side on a base with clearances between the die blocks. In pressing operation, thermal expansion of the die blocks is absorbed by the clearances between the die blocks.

SUMMARY OF THE INVENTION

However, the above mentioned conventional arts have the following shortcomings.

In the press die apparatus shown in FIGS. 9 and 10, the die blocks 45 are placed on the base 46 and fitted in the frame 47 such that the die blocks 45 are aligned lengthwise and widthwise in the frame 47 to form three block rows 45A, 45B, 45C. A joint portion 451 exists between any two adjacent die blocks 45 in each of the block rows 45A, 45B, 45C. Each joint portion 451 is positioned to match with a joint portion 451 between two adjacent die blocks 45 in a block row 45B, 45C, 45A that is adjacent to the block row 45A, 45B, 45C. Thus, when the die blocks 45 receive a great pressing force and are deformed outward during pressing of a workpiece, the corner sections 452 of any two die blocks 45 that belong to adjacent pair of the block rows 45A, 45B, 45C may strike each other and be damaged.

In the press machine disclosed in Japanese Laid-Open Patent Publication No. 2008-296262, it is difficult to position the die blocks of the lower die on the base while maintaining clearances between the die blocks without causing any displacement. Further, although Japanese Laid-Open Patent Publication No. 2008-296262 discloses that the clearances between the die blocks absorb thermal expansion of the die blocks, the document does not suggest a function for preventing the corner sections of the die blocks from being damaged by striking each other during pressing.

Accordingly, it is an objective of the present invention to provide a press die that reduces the possibility of damage to corner sections of die blocks during pressing of a workpiece due to collision between a corner section of a die block belonging to one of adjacent block rows and a corner section of a die block belonging to the other block row.

To achieve the foregoing objective and in accordance with one aspect of the present invention, a press die is provided that includes a plurality of block rows arranged in parallel in a frame. Each block row is formed by a plurality of die blocks. The block rows include a first block row and a second block row that are adjacent to each other. A joint portion between adjacent two die blocks belonging to the first block row faces a side surface of a die block belonging to the second block row.

In one embodiment, the first block row includes a first block pair formed by a die block located at an end of the first block row and a die block located adjacent thereto, and the second block row includes a second block pair formed by a die block located at an end of the second block row and a die block located adjacent thereto. A joint portion between the first block pair may face a joint portion between the second block pair.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

A press die apparatus having press dies according to one embodiment of the present invention will now be described with reference to FIGS. 1 to 6.

Figure 1:
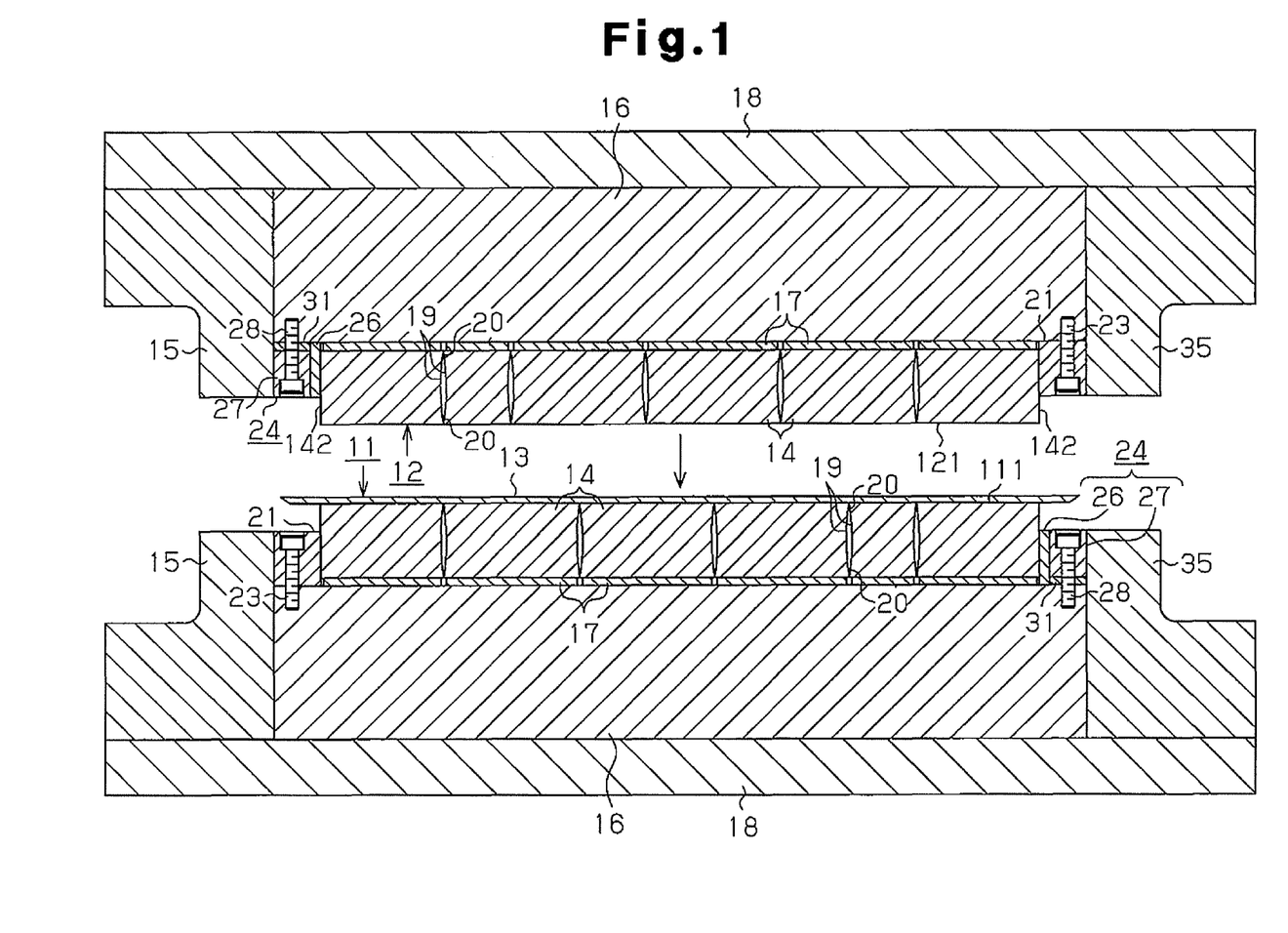
FIG. 1 is a cross-sectional view illustrating a press die apparatus according to one embodiment of the present invention.

As shown in FIG. 1, the press die apparatus of the present embodiment includes a lower die 11 and an upper die 12, which are press dies. The upper die 12 is arranged above the lower die 11 to be brought toward and away from the lower die 11. The lower die 11 has on the upper surface a die surface 111, and the upper die 12 has on the lower surface a die surface 121, which has a shape corresponding to the die surface 111 of the lower die 11. With a workpiece 13 placed on the die surface 111 of the lower die 11, the upper die 12 is brought toward the lower die 11 to press the workpiece 13 into a predetermined shape between the die surfaces 111, 121 of the dies 11, 12.

Figure 2:
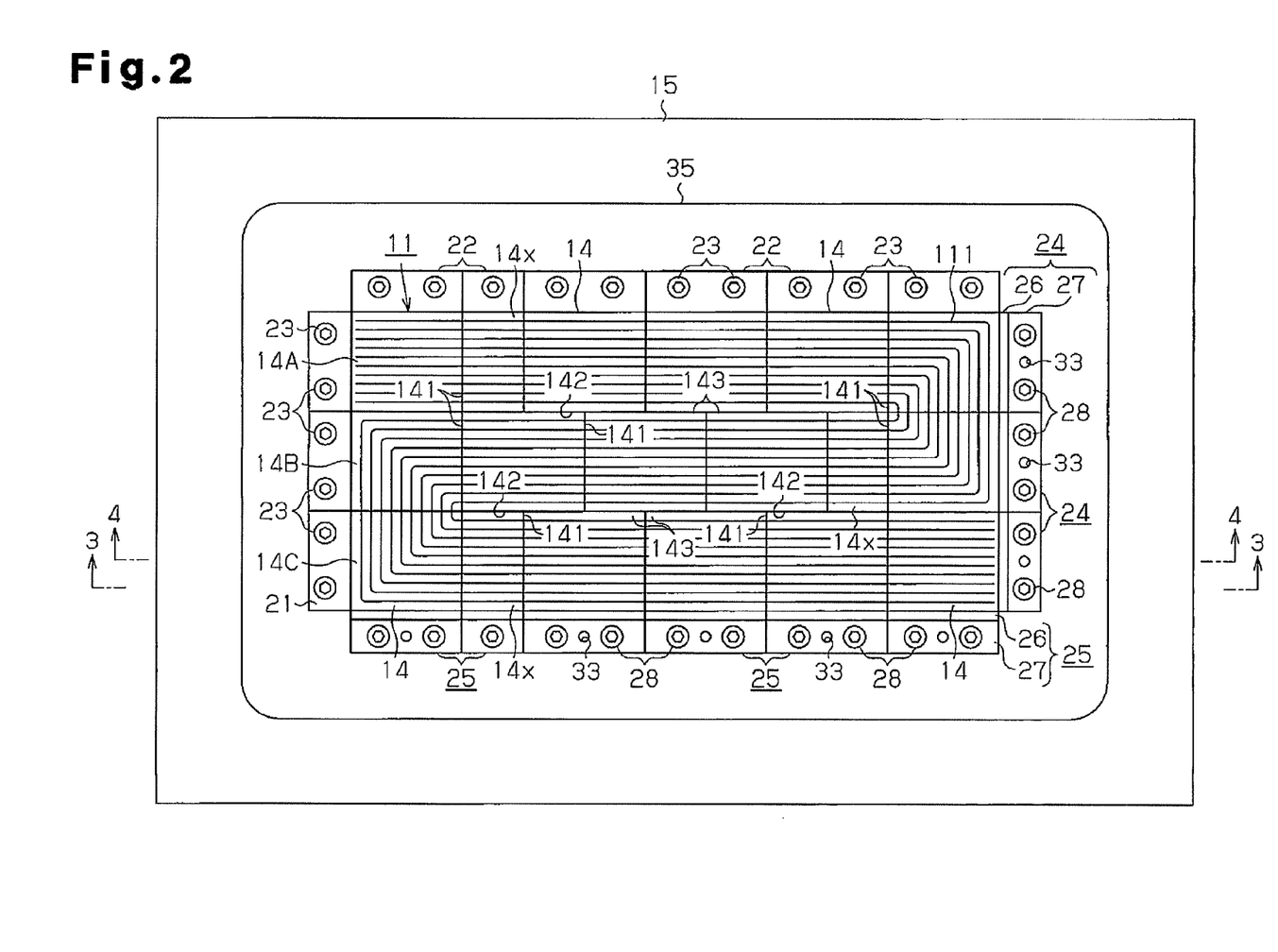
FIG. 2 is a plan view illustrating a lower die of the press die apparatus of FIG. 1.

As illustrated in FIGS. 1 and 2, the lower die 11 is formed by die blocks 14, which are separate rectangular columns. The die blocks 14 are arranged in a frame 15, which has an oblong rectangular shape as viewed from above to surround the die blocks 14, and placed on a base 16 with shims 17 arranged in between. The frame 15 and the base 16 are fixed to a support plate 18. The die blocks 14 are in an aligned state in which block rows 14A, 14B, 14C (the number of which is three in the present embodiment) are arranged in parallel in the transverse direction of the frame 15, which is perpendicular to the longitudinal direction of the frame 15, and each of the block rows 14A, 14B, 14C extends along the longitudinal direction of the frame 15.

As shown in FIGS. 1 and 2, each of the block rows 14A, 14B, 14C includes a die block 14x, which is a die block 14 having a measurement in the extending direction of the block row 14A, 14B, 14C shorter than those of the other die blocks 14.

The die blocks 14 that are located in a central part in the extending direction of each of the block rows 14A, 14B, 14C receive a particularly great pressing force during pressing of the workpiece 13. Accordingly, a joint portion 141 at which each of the die blocks 14 in the central part contacts one of the adjacent die blocks 14 in the same block row 14A, 14B, 14C is arranged to face the side surface 142 of a die block 14 belonging to a block row 14B, 14C, 14A that is adjacent to the block row 14A, 14B, 14C.

In contrast, the die blocks 14 that are located at opposite ends and the second die blocks 14 from the opposite ends in the extending direction of each of the block rows 14A, 14B, 14C do not receive a significant great pressing force during pressing of the workpiece 13. Accordingly, a joint portion 141 at which each of the die blocks 14 at the ends contacts the adjacent die block 14 in the same block row 14A, 14B, 14C is arranged to face a joint portion 141 between two die blocks 14 belonging to a block row 14B, 14C, 14A that is adjacent to the block row 14A, 14B, 14C.

Figure 3:
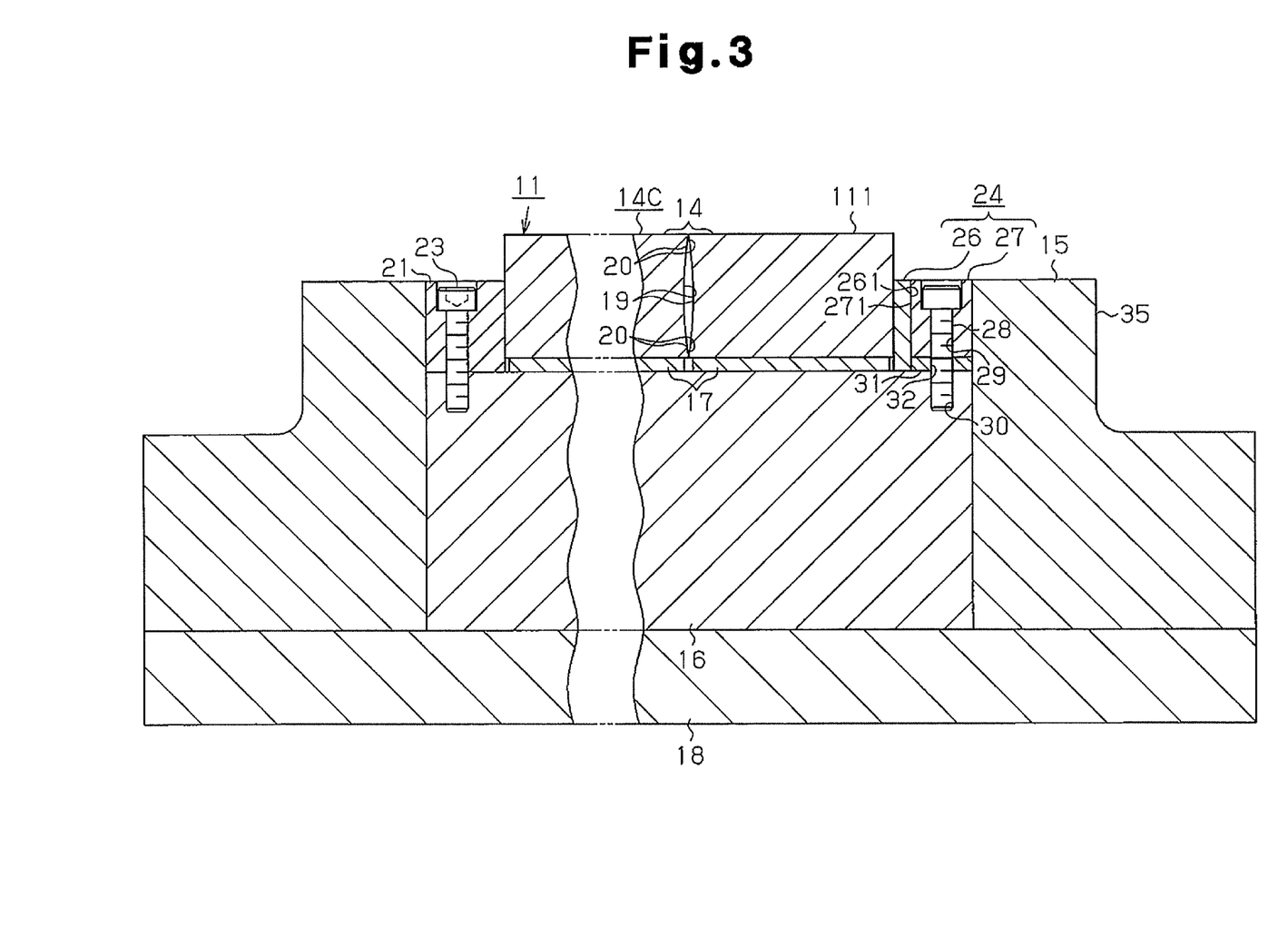
FIG. 3 is a partial cross-sectional view taken along line 3-3 of FIG. 2.

As shown in FIGS. 1 to 3, each die block 14 has four side surfaces 142, and each side surface 142 is formed by a concave portion 19, which has an arcuate surface, and two flat portions 20 located at the upper and lower ends in the side surface 142. The concave portions 19 formed in the facing side surfaces 142 of two adjacent die blocks 14 are arranged to face each other. However, of the side surfaces 142 of the die blocks 14 that are adjacent to the frame 15, the side surfaces 142 facing the frame 15 are each formed to be entirely flat.

As shown in FIGS. 1 to 3, a block-shaped space member 21 is located between the inner surface of the frame 15 that is located at one end in the longitudinal direction of the frame 15 and each of the die blocks 14 adjacent thereto. Also, a block-shaped space member 22 is located between the inner surface of the frame 15 that is located at one end in the transverse direction of the frame 15 and each of the die blocks 14 adjacent thereto. Each of the space members 21, 22 is fixed to the base 16 with screws 23.

A wedge 24 is located between the inner surface of the frame 15 that is located at the other end in the longitudinal direction of the frame 15 and each of the die blocks 14 adjacent thereto. A wedge 25 is located between the inner surface of the frame 15 that is located at the other end in the transverse direction of the frame 15 and each of the die blocks 14 adjacent thereto.

The wedges 24 and wedges 25 press the die blocks 14, which are aligned lengthwise and widthwise in the frame 15, toward the space members 21 and space members 22, respectively.

The configuration of the wedges 24, 25 will now be described. Since the wedges 24 have the same structures as those of the wedges 25, only the wedge 24 will be described, and the description of the wedge 25 will be omitted.

As shown in FIGS. 1 to 3, each wedge 24 includes a first wedge member 26, which is located adjacent to the corresponding die block 14 and is placed on the base 16, and a second wedge member 27, which is located between the first wedge member 26 and the frame 15. Although not illustrated, the facing side surfaces of the wedge members 26, 27 are formed as inclined surfaces 261, 271 contacting each other. The inclined surfaces 261, 271 gradually approach the frame 15 adjacent to the second wedge member 27 from the upper end to the lower end of the wedge 24. The second wedge member 27 has a pair of insertion holes 29 for allowing screws 28 pass through the upper and lower surface of the second wedge member 27. The base 16 has screw holes 30, with which the screws 28 are threaded, at positions corresponding to the insertion holes 29.

The screws 28 are threaded and fastened to the screw holes 30 via the insertion holes 29 from above the second wedge member 27, so that the second wedge member 27 is moved toward the base 16. Accordingly, the wedge effect due to interaction between the inclined surfaces 261, 271 of the wedge members 26, 27 presses the first wedge member 26 against the block 14. As a result, the die blocks 14 in each of the block rows 14A to 14C are pressed toward the corresponding space member 21, so that there is no clearance between the die blocks 14.

As shown in FIGS. 1 and 3, a flat plate-like spacer 31 is located between each second wedge member 27 and the base 16. The spacer 31 has two insertion holes 32 for allowing the screws 28 to pass through. The spacer 31 limits the amount of movement of the second wedge member 27 toward the base 16 during fastening with the screws 28. That is, the thickness of each spacer 31 sets to a predetermined level the extent of the wedge effect produced by the wedge members 26, 27 of the corresponding wedge 24, or in other words, the force by which the die blocks 14 in the corresponding block row 14A to 14C are pressed toward the corresponding space member 21.

Figure 4:
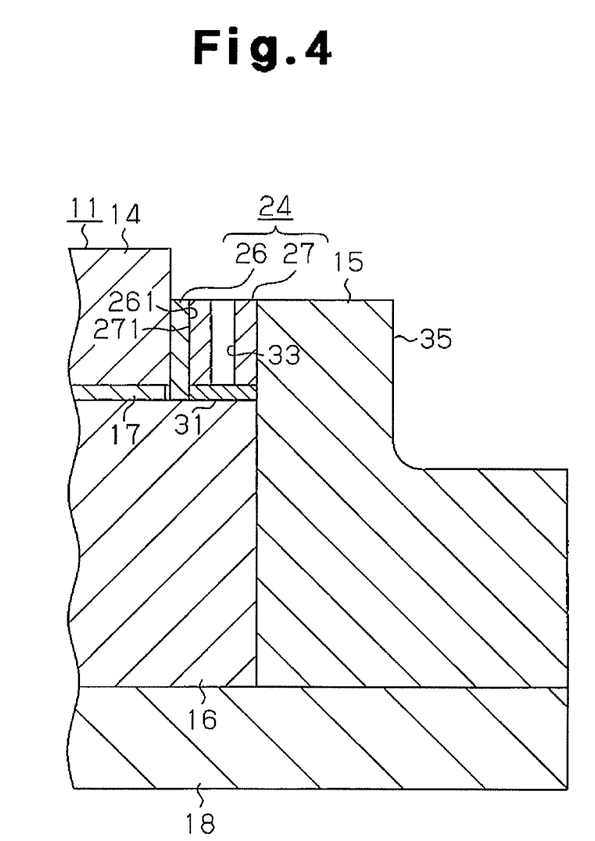
FIG. 4 is a partial cross-sectional view taken along line 4-4 of FIG. 2.

As shown in FIGS. 2 and 4, each second wedge member 27 has a through hole 33 at the center of the space between the insertion holes 29. The through hole 33 extends between the upper and lower surfaces of the second wedge member 27. The through hole 33 is used to measure the position of the second wedge member 27. That is, when each second wedge member 27 is moved toward the base 16 by fastening the screws 28 without placing the spacers 31 between the base 16 and the second wedge members 27, as a result of which the die blocks 14 are brought to an aligned state, the position of the second wedge member 27 is measured by using the through hole 33.

As shown in FIGS. 1 to 3, a measurement surface 35 is formed on the periphery of the upper portion of the frame 15. The measurement surface 35 is used to measure deformation of the frame 15 caused by the wedge effect of the wedge members 26, 27.

As illustrated in FIG. 1, the upper die 12 is formed by die blocks 14, which are separate rectangular columns, as in the case of the lower die 11. The die blocks 14 of the upper die 12 are arranged in the frame 15 substantially in the same aligned state as the die blocks 14 of the lower die 11. Each die block 14 of the upper die 12 has four side surfaces 142, and each side surface 142 is formed by a concave portion 19, which has an arcuate surface, and two flat portions 20 located at the upper and lower ends in the side surface 142. A wedge 24, 25 is located between the frame 15 of the upper die 12 and each of the die blocks 14 adjacent to the frame 15 to bring the die blocks 14 of the upper die 12 to an aligned and fixed state by the wedge effect of the wedge 24, 25. Each wedges 24, 25 of the upper die 12 is formed by first and second wedge members 26, 27 (only a wedge 24 is shown in FIG. 1). A spacer 31 is provided between the base 16 and each wedge 24 of the upper die 12 to set the extent of the wedge effect of the wedge 24 to a predetermined level.

Operation of the present embodiment will now be described.

Figure 5:
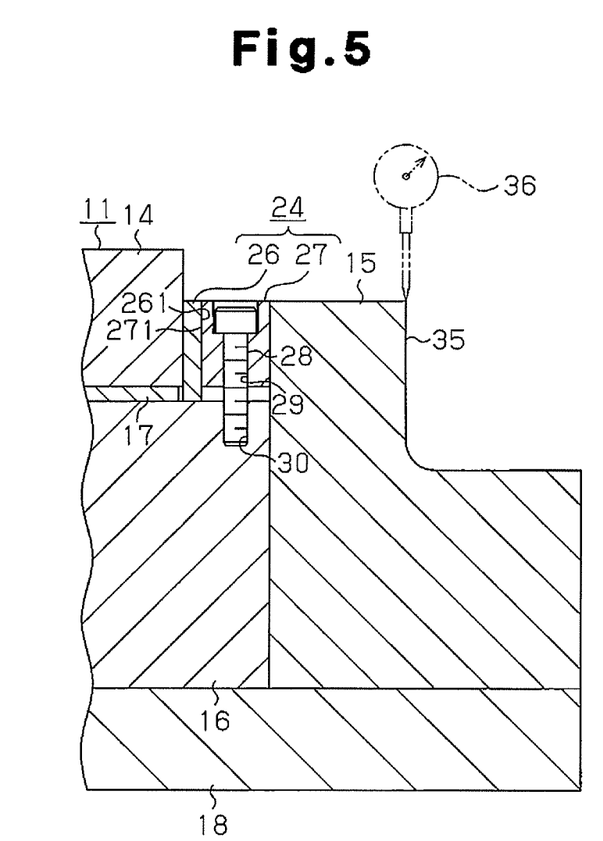
FIG. 5 is an explanatory partial cross-sectional view of a method for fixing die blocks of the lower die in an aligned state.

To bring the die blocks 14, which form the lower die 11, to an aligned state in the frame 15, each second wedge member 27 is moved toward the base 16 by fastening the screws 28 without placing the spacer 31 between the base 16 and the second wedge member 27 as shown in FIG. 5. As a result, due to the wedge effect produced by interaction between the inclined surfaces 261, 271 of the wedge members 26, 27, the die blocks 14 belonging to the corresponding block row 14A, 14B, 14C are pushed and moved toward the corresponding space member 21, so that the blocks 14 are arranged in an aligned state. The aligned state of the die blocks 14 are confirmed visually or with a position alignment gauge 36.

That is, when the screws 28 are fastened, the frame 15 is pressed outward and deformed by the wedge effect of the wedge members 26, 27. The amount of deformation of the frames 15 is measured at the measurement surface 35 of the frame 15 with the position alignment gauge 36. When the measured deformation amount has reached a predetermined value, it is assumed that the die blocks 14 have been brought to a predetermined aligned state.

Figure 6:
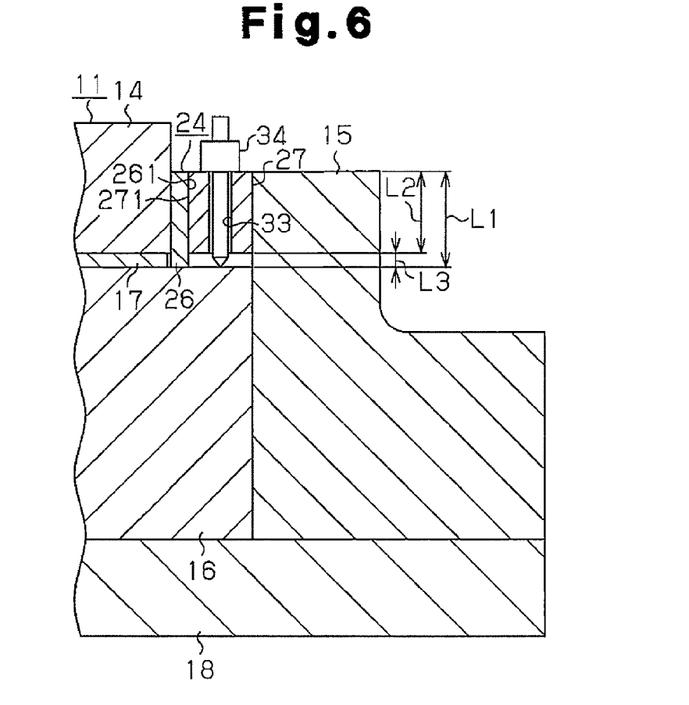
FIG. 6 is an explanatory partial cross-sectional view of the die block fixing method subsequent to FIG. 5.

Subsequently, in the predetermined aligned state of the die blocks 12, a depth gauge 34 is passed through the through hole 33 of each second wedge member 27 to measure the distance L1 from the upper surface of the second wedge member 27 to the upper surface of the base 16 as shown in FIG. 6. Then, the thickness L2 of the second wedge member 27 is subtracted from the measured distance L1 to obtain the distance L3 from the lower surface of the second wedge member 27 to the upper surface of the base 16. Thereafter, the spacer 31 is adjusted, for example, by grinding to have the same thickness as the distance L3. Then, the spacer 31 with the adjusted thickness is placed between the second wedge member 27 and the base 16.

Since the spacer 31, the thickness of which has been adjusted, is placed between the second wedge member 27 and the base 16, when the die blocks 14 are replaced, the aligned state can be easily restored with the replacing die blocks 12. That is, at the time of moving each second wedge member 27 toward the base 16 by fastening the screws 28 to bring the replacing die blocks 14 to an aligned state, the lower surface of the second wedge member 27 contacts the spacer 31 as shown in FIG. 3 when the extent of the wedge effect of the wedge members 26, 27 reaches the predetermined level. Accordingly, movement of the second wedge member 27 toward the base 16 is restricted, and the die blocks 14 after the replacement are arranged in the same aligned state as that before the replacement.

During operation of the press die apparatus, with the workpiece 13 placed on the lower die 11 as shown in FIG. 1, the upper die 12 is moved toward the lower die 11, so that the workpiece 13 is pressed against the die surface 111 of the lower die 11. The workpiece 13 is thus pressed to have a predetermined shape. During pressing of the workpiece 13, the die blocks 14 of the lower die 11 receive a great pressing force, and the side surfaces 142 of the die blocks 14 are deformed outward. At this time, since the side surfaces 142 of each die block 14 that face the side surfaces 142 of the other die blocks 14 each have a concave portion 19, the deformation of the side surfaces 142 of the die block 14 is absorbed by the concave portions 19. Therefore, the outward force that is the result of cumulative deformation of the die blocks 14 is prevented from acting on the frame 15, which holds the die blocks 14. The frame 15 is thus not damaged.

Further, during pressing of the workpiece 13, each die block 14 of the upper die 12 receives reaction force of the pressing force so that the side surfaces 142 of the die blocks 14 are deformed outward. At this time, since the side surfaces 142 of each die block 14 of the upper die 12 that face the side surfaces 142 of the other die blocks 14 each have a concave portion 19, the deformation of the side surfaces 142 of the die block 14 is absorbed by the concave portions 19 as in the case of the lower die 11. Therefore, the outward force that is the result of cumulative deformation of the die blocks 14 of the upper die 12 is prevented from acting on the frame 15, which holds the die blocks 14 of the upper die 12. The frame 15 is thus not damaged.

Further, during pressing of the workpiece 13, great pressing force and reaction force act particularly on the central parts of the dies 11, 12. A joint portion 141 at which each of the die blocks 14 in the central part of the dies 11, 12 contacts one of the adjacent die blocks 14 in the same block row 14A, 14B, 14C is arranged to face the side surface 142 of a die block 14 belonging to a block row 14B, 14C, 14A that is adjacent to the block row 14A, 14B, 14C. Thus, the corner sections 143 of the die blocks 14 are less likely to be damaged due to collision between a corner section 143 of a die block 14 belonging to one of adjacent block rows 14A, 14B, 14C and a corner section 143 of a die block 14 belonging to the other block row 14A, 14B, 14C.

The press die apparatus having the press die according to the above described embodiment has the following advantages.

(1) The press die includes block rows 14A, 14B, 14C, which are aligned in the frame 15 and each include die blocks 14. Adjacent two die blocks 14 in the same one of the block rows 14A, 14B, 14C contact each other at a joint portion 141. Some of the joint portions 141 each face the side surface 142 of a die block 14 belonging to the adjacent one of the block rows 14B, 14C, 14A. According to this configuration, the corner sections 143 of two die blocks 14 in adjacent pair of the block rows 14A, 14B, 14C are not likely to strike each other even if the die blocks 14 receive pressing force and are deformed outward during pressing of the workpiece 13. This reduces the possibility of damages to the corner sections 143 of the die blocks 14 due to collision.

(2) Of the die blocks 14 in each of the block rows 14A, 14B, 14C, the joint portion 141 between the die block 14 at each end of the block row 14A, 14B, 14C and the second die block 14 from the end is arranged to face the joint portion 141 between the die block 14 at one end of the adjacent one of the block rows 14B, 14C, 14A and the second die block 14 from the end. This configuration does not cause damage to the corner sections 143 of the die blocks 14 at the ends of the block rows 14A, 14B, 14C since no significantly strong pressing force is applied to the die blocks 14 at the ends of the block rows 14A, 14B, 14C during pressing of the workpiece 13. On the other hand, the die blocks 14 at the ends of the block rows 14A, 14B, 14C can be easily brought to an aligned state.

(3) A wedge 24, 25 is located between the inner surface of the frame 15 and each of the die blocks 14 facing the inner surface of the frame 15, so that the die blocks 14 are brought to an aligned and fixed state by the wedge effect of the wedges 24, 25. Therefore, the die blocks 14 can be easily brought to the aligned and fixed state in the frame 15 by the wedge effect produced by adjusting the wedges 24, 25.

(4) A spacer 31 is provided between the base 16 and each of the wedges 24, 25 to set the extent of the wedge effect to a predetermined level. Therefore, the amount of movement of each wedge 24, 25 is limited by the spacer 31, so that the extent of the wedge effect of the wedge 24, 25 is set to a predetermined level. Thus, when the die blocks 14 are replaced, the aligned state of the die blocks 14 before the replacement can be easily restored with the replacing die blocks 14.

(5) By fastening a screw 28 to one of the screw holes 30 of the base 16, the corresponding wedge 24, 25 is adjusted to increase the wedge effect produced by the wedge 24, 25. Therefore, the die blocks 14 are easily brought to the aligned and fixed state through adjustment of the wedges 24, 25 by fastening the screws 28.

(6) Of the side surfaces 142 of the die blocks 14, each of the side surfaces 142 that face another die block 14 has a concave portion 19. Thus, when the die blocks 14 receive pressing force and are deformed outward during pressing of the workpiece 13, the deformation is absorbed by the concave portions 19 of the side surfaces 142 of the die blocks 14. Therefore, the outward force that is the result of cumulative deformation of the die blocks 14 is prevented from acting on the frame 15, which holds the die blocks 14. This reduces the possibility of damages to the frame 15 due to the outward force.

(7) The flat portions 20, which can be held in area contact with other die blocks 14, are formed in the upper and lower ends of the side surface 142 of each die block 14. Thus, despite the concave portions 19 formed in the side surfaces 142 of the die blocks 14, the die blocks 14 can be easily brought to the predetermined aligned state by causing the flat portions 20 of adjacent die blocks 14 to contact each other.

The above described embodiment may be modified as described below.

Of the four side surfaces 142 of each of the die blocks adjacent to the frame 15, the side surface that faces the frame 15 may have a concave portion having an arcuate surface like the other three side surfaces. In this case, the frame 15 is prevented from receiving outward force generated by deformation of the die blocks 14 at positions contacting the frame 15.

Not only joint portions between die blocks at a central part of each block row, but all the joint portions may be arranged to face the side surface of a die block belonging to the adjacent block row.

The technical ideas obtainable from the above embodiment and modifications will hereafter be described.

Item A. The press die according to claim 1 or 2, further comprising:
  a base on which the die blocks are placed;
  a wedge located between the frame and one of the die blocks, wherein the wedge produces a wedge effect of bringing the die blocks to an aligned and fixed state; and
  a spacer located between the base and the wedge to set the extent of the wedge effect to a predetermined level.

Item B. The press die according to item A, further comprising a screw, wherein
  the base has a screw hole, into which the screw is threaded, and
  the wedge is configured to increase the wedge effect by fastening the screw.

Item C. The press die according to item A or B, wherein the wedge has a surface facing the base and a surface facing in a direction opposite to the base, and the wedge has a through hole extending between the two surfaces.

Item D. The press die according to item C, wherein
  the wedge includes first and second wedge members each having an inclined surface, the inclined surfaces contacting with each other,
  the second wedge member has an insertion hole, through which the screw is passed, and the through hole, and
  the spacer is located between the base and the second wedge member.

Item E. A press die apparatus comprising:
  a first die having an end face on which a die surface is formed; and
  a second die for pressing a workpiece placed on the first die, wherein
  at least one of the first die and the second die is configured by the press die according to claim 1 or 2 or any one of items A to D, and
  each die block of the press die has a concave side surface facing another die block.

Item F. The press die apparatus according to item E, wherein the side surface of each of the die blocks has a flat end portion that can be held in area contact with an end portion of another die block.

Item G. The press die apparatus according to item E or F, wherein a die block that is adjacent to the frame, into which the die blocks are fitted, has a concave side surface facing the frame.

Item H. The press die apparatus according to item G, wherein the side surface of the die block adjacent to the frame has a flat end portion that can be held in area contact with the frame.

Item I. The press die apparatus according to any one of items E to H, wherein
  each die block is formed as a rectangular column and has a corner section, and
  the corner section of at least part of the die blocks is located to face a side surface of an adjacent die block.

Item J. A die block that is one of a plurality of die blocks, which are assembled to configure a die of a press die apparatus,
  wherein the die block has an end face on which a die surface is formed and a concave side surface that faces another die block.

Item K. The die block according to item J, wherein the side surface has a flat end portion that can be held in area contact with an end portion of another die block.

What is claimed is:

1. A press die comprising a plurality of block rows arranged in parallel in a frame, each block row being defined by a plurality of die blocks, wherein
  the plurality of block rows include a first block row and a second block row that are adjacent to each other,
  at least one joint portion is defined by the abutment of adjacent side surfaces of two die blocks belonging to the first block row,
  the at least one joint portion abuts a side surface of a die block belonging to the second block row,
  the first block row includes a first block pair defined by a die block located at an end of the first block row and a die block located adjacent thereto,
  the second block row includes a second block pair defined by a die block located at an end of the second block row and a die block located adjacent thereto,
  a first end joint portion defined between the first block pair faces a second end joint portion defined between the second block pair, and
  each of the plurality of block rows includes an alignment die block having a width that is less than a width of the other die blocks in the respective block row.

2. The press die according to claim 1, wherein
  an end of the at least one joint portion is defined by the abutment of side surfaces of the adjacent two die blocks of the first block row at perpendicular corners of the adjacent two die blocks of the first block row, and
  the end of the at least one joint portion abuts the side surface of the die block belonging to the second block row.

3. The press die according to claim 1, wherein
  each of the plurality of block rows extend along a longitudinal direction of the press die,
  the width of the alignment die block in each respective block row extends along the longitudinal direction that and the width of the other die blocks in the respective block row extends along the longitudinal direction, and
  the alignment die block of each of the plurality of block rows is disposed between two of the other die blocks in the respective block row.

4. A press die comprising a plurality of block rows arranged in parallel in a frame, each block row being defined by a plurality of die blocks, wherein
  the plurality of block rows include a first block row and a second block row that are adjacent to each other,
  at least one joint portion is defined by the abutment of adjacent side surfaces of two die blocks belonging to the first block row,
  the at least one joint portion abuts a side surface of a die block belonging to the second block row, and
  each die block comprises:
    a plurality of side surfaces, the plurality of side surfaces including the side surfaces of the adjacent two die blocks of the first block row and the side surface of the die block belonging to the second block row, wherein,
    each side surface, of the plurality of side surfaces of each die block, that faces another die block, includes a concave portion configured to absorb a pressing force.

5. The press die according to claim 4, wherein
each of the plurality of block rows includes an alignment die block having a width that is less than a width of the other die blocks in the respective block row.

6. The press die according to claim 5, wherein
each of the plurality of block rows extend along a longitudinal direction of the press die,
the width of the alignment die block in each respective block row extends along the longitudinal direction and the width of the other die blocks in the respective block row extends along the longitudinal direction, and
the alignment die block of each of the plurality of block rows is disposed between two of the other die blocks in the respective block row.

7. A press die comprising:
a frame;
a plurality of block rows arranged in parallel in the frame, each block row being defined by a plurality of die blocks; the plurality of block rows including a first block row and a second block row;
a first joint portion defined by the abutment of adjacent side surfaces of a first die block and a second die block belonging to the first block row;
a second joint portion defined by the abutment of side surfaces of two die blocks belonging to the first block row, at least one of the two die blocks being a die block other than the first die block and the second die block; and
a third joint portion defined by the abutment of adjacent side surfaces of two die blocks belonging to the second block row, wherein
the first joint portion abuts a side surface of a die block belonging to the second block row,
the second joint portion abuts the third joint portion, and
each of the plurality of block rows includes an alignment die block having a width that is less than a width of the other die blocks in the respective block row.

8. The press die according to claim 7, wherein
each of the plurality of block rows extend along a longitudinal direction of the press die,
the width of the alignment die block in each respective block row extends along the longitudinal direction and the width of the other die blocks in the respective block row extends along the longitudinal direction, and
the alignment die block of each of the plurality of block rows is disposed between two of the other die blocks in the respective block row.

* * * * *